US009519870B2

(12) United States Patent
Sarikaya et al.

(10) Patent No.: US 9,519,870 B2
(45) Date of Patent: Dec. 13, 2016

(54) WEIGHTING DICTIONARY ENTITIES FOR LANGUAGE UNDERSTANDING MODELS

(71) Applicant: MICROSOFT CORPORATION, Redmond, WA (US)

(72) Inventors: Ruhi Sarikaya, Redmond, WA (US); Xiaohu Liu, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 461 days.

(21) Appl. No.: 14/207,986

(22) Filed: Mar. 13, 2014

(65) Prior Publication Data

US 2015/0262078 A1  Sep. 17, 2015

(51) Int. Cl.
  *G06N 99/00* (2010.01)
  *G06N 7/00* (2006.01)
  *G06F 17/30* (2006.01)

(52) U.S. Cl.
  CPC .................. *G06N 99/005* (2013.01)

(58) Field of Classification Search
  CPC ........ G06N 99/00; G06N 99/005; G06N 7/00; G06N 7/005; G06F 17/30; G06F 17/3053; G06F 17/30887
  USPC .......................................................... 706/12
  See application file for complete search history.

(56) References Cited

U.S. PATENT DOCUMENTS

| 7,328,146 | B1 | 2/2008 | Alshawi et al. | |
| 2004/0148170 | A1 | 7/2004 | Acero et al. | |
| 2011/0314011 | A1* | 12/2011 | Buehrer | G06F 17/30864 707/728 |
| 2012/0290293 | A1* | 11/2012 | Hakkani-Tur | G06F 17/30864 704/9 |
| 2012/0317088 | A1 | 12/2012 | Pantel et al. | |
| 2013/0080165 | A1 | 3/2013 | Wang et al. | |
| 2014/0180676 | A1* | 6/2014 | Hillard | G06F 17/278 704/9 |
| 2014/0236570 | A1* | 8/2014 | Heck | G06F 17/30654 704/9 |

(Continued)

OTHER PUBLICATIONS

Liu X. et al., "A Discriminative Model Based Entity DictionaryWeighting Approach for Spoken Language Understanding", IEEE SLT 2014, Dec. 7-10, 2014, pp. 195-199. (Date/authors preclude usage).*

(Continued)

*Primary Examiner* — Stanley K Hill
*Assistant Examiner* — Dave Misir
(74) *Attorney, Agent, or Firm* — Steven Spellman; Tom Wong; Micky Minhas (57) ABSTRACT

A dictionary used by a spoken language understanding (SLU) system is improved by providing weightings for entities in the dictionary that represent the likelihood each entity belongs to an entity class represented by the dictionary. A classifier model may be trained using a seed list containing sample entities that belong in the entity class and a background entity list containing samples that do not belong in the entity class. Clicked URLs from search logs, search result URLs, and attributes from an entity graph may be used as features of the sample entities to train the classifier model. The classifier model may be used to weight entities from a candidate dictionary. The entity weightings are used to generate an improved dictionary for use in the SLU system.

19 Claims, 4 Drawing Sheets

(56) References Cited

U.S. PATENT DOCUMENTS

2014/0379323 A1* 12/2014 Anastasakos ..... G06F 17/30654
   704/9
2015/0178273 A1* 6/2015 Hakkani-Tur .......... G06F 17/28
   704/9

OTHER PUBLICATIONS

Tur, et al., "Employing Web Search Query Click Logs for Multi-Domain Spoken Language Understanding", In IEEE Workshop on Automatic Speech Recognition and Understanding, Dec. 11, 2011, 6 pages.
Heck, et al., "Leveraging Knowledge Graphs for Web-Scale Unsupervised Semantic Parsing", In Proceedings of 14th Annual Conference of the International Speech Communication Association, Aug. 25, 2013, 5 pages.
Tur, et al., "Towards Unsupervised Spoken Language Understanding: Exploiting Query Click Logs for Slot Filling", In Proceedings of 12th Annual Conference of the International Speech Communication Association, Aug. 27, 2011, 4 pages.
Tur, et al., "Combining Active and Semi-Supervised Learning for Spoken Language Understanding", In Proceedings of Speech Communication, vol. 45, No. 2, Feb. 2005, 16 pages.
Zhu, Xiaojin, "Semi-Supervised Learning with Graphs", In Doctoral thesis, May, 2005, 174 pages.
Celikyilmaz, et al., "Leveraging Web Query Logs to Learn User Intent via Bayesian Discrete Latent Variable Model", In Proceedings of 28th International Conference on Machine Learning, Jun. 28, 2011, 6 Pages.
Bangalore, et al., "Learning the Structure of Task-driven Human-Human Dialogs", In Proceedings of 21st International Conference on Computational Linguistics and 44th Annual Meeting of the Association for Computational Linguistics, Jul. 2006, 8 pages.
Christensen, et al., "Instance-Driven Attachment of Semantic Annotations over Conceptual Hierarchies", In Proceedings of 13th Conference of the European Chapter of the Association for Computational Linguistics, Apr. 23, 2010, 11 pages.
Tur, et al., "Exploiting Query Click Logs for Utterance Domain Detection in Spoken Language Understanding", In IEEE International Conference on Acoustics, Speech and Signal Processing, May 22, 2011, 4 pages.
Tur, et al., "Using a Knowledge Graph and Query Click Logs for Unsupervised Learning of Relation Detection", In IEEE International Conference on Acoustics, Speech and Signal Processing, May 26, 2013, 5 pages.
Hillard, et al., "Learning Weighted Entity Lists from Web Click Logs for Spoken Language Understanding" In Proceedings of Annual Conference of the International Speech Communication Association, Aug. 28, 2011, 4 pages.
Tur, et al., "Bootstrapping Domain Detection Using Query Click Logs for New Domains", "In Proceedings of 12th Annual Conference of the International Speech Communication Association" Aug. 28, 2011, 4 pages.
Gorin, et al., "How May I Help You?", In Proceedings Speech Communication, vol. 23, Issue 1-2, Oct. 1997, 15 Pages.
Guha, et al., "Semantic Search", "In Proceedings of 12th International World Wide Web Conference" May 20, 2003, 10 pages.
Gupta, et. al., "The AT&T Spoken Language Understanding System" In IEEE Transactions on Audio, Speech, and Language Processing, vol. 14, Issue 1, Jan. 2006, 10 pages.
Tur, et al., "A Weakly-Supervised Approach for Discovering New User Intents from Search Query Logs" In Proceedings of 14th Annual Conference of the International Speech Communication Association, Aug. 2013, 5 pages.
Heck, et al., "Exploiting the Semantic web for Unsupervised Spoken Language Understanding" In IEEE Spoken Language Technology Workshop, Dec. 2012, 6 pages.
Li, et al., "Learning Query Intent from Regularized Click Graphs" In Proceedings of 31st Annual ACM SIGIR conference on Research and Development in Information Retrieval, Jul. 19, 2009, 8 pages.
Li, et al., "Extracting Structured Information from User Queries with Semi-Supervised Conditional Random Fields", In Proceedings of 32nd International ACM SIGIR Conference on Research and Development in Information Retrieval, Jul. 19, 2009, 8 Pages.
McIlraith et. "Semantic Web Services", In IEEE Intelligent Systems, Mar. 2001, 8 pages.
Mintz, et al. "Distant Supervision for Relation Extraction without Labeled Data", In Proceedings of the Joint Conference of 47th Annual Meeting of the ACL and the 4th International Joint Conference on Natural Language Processing of the AFNLP, Aug. 2, 2009, 9 pages.
Shadbolt, et al., "The Semantic Web Revisited" In IEEE Intelligent Systems, vol. 21, Issue 3, Jan. 1, 2006, 6 pages.
Tur, et al., "Exploiting the Semantic Web for Unsupervised Natural Language Semantic Parsing", In Proceedings of Interspeech, Sep. 2012, 4 pages.
Wang, et al., "Semi-Supervised Learning of Semantic Classes for Query Understanding—from the Web and for the Web", In Proceedings of 18th ACM Conference on Information and Knowledge Management, Nov. 2, 2009, 10 pages.
Ward, et al., "The CMU Air Travel Information Service: Understanding Spontaneous Speech" In Proceedings of the Workshop on Speech and Natural Language, Jun. 24, 1990, 3 pages.

* cited by examiner

WEIGHTING DICTIONARY ENTITIES FOR LANGUAGE UNDERSTANDING MODELS

BACKGROUND

Spoken language understanding (SLU) may be used in a variety of different systems that attempt to understand users' queries and other user input. For instance, SLU may be an important module used in a dialog system that attempts to understand users' utterances. Given an utterance, SLU may be used to extract a semantic frame to represent the utterance's intent and semantic slots.

SLU models are often trained from domain specific queries with semantic annotation. Various features, including N-grams, rules, dictionaries, etc., may be used to train SLU models. The same set of features may also be extracted at run time for semantic decoding.

A dictionary used by an SLU model includes entities that belong to the same entity class (e.g., movie names, music tracks, etc.). As it is difficult to obtain enough training data to cover all semantic slots in a domain, such as hundreds of thousands of movie names and music tracks, dictionaries may be used to increase model coverage and improve the model's performance. Experiments show that large and clean dictionaries are effective to improve a model's accuracy. The impact is more dramatic when the test data are quite different than training data, in which case, contextual features like n-grams are not sufficient.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to weighting entities in a dictionary used by a spoken language understanding (SLU) system based on the likelihood the entities belong to a particular entity class. A classifier model is built using a seed list of sample entities that belong to the entity class and a background entity list of sample entities that do not belong to the entity class. Additionally, clicked URLs from search click logs, search result URLs, and attributes from an entity graph are used as features of the sample entities to train the classifier model. The classifier model is used to weight entities in a candidate dictionary to provide weightings for the entities that reflect the likelihood each entity belongs to the entity class. The weightings may be used to provide an improved dictionary, which may be used to improve an SLU system's accuracy.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As noted above, dictionaries are often used as features in spoken language understanding (SLU) systems to improve coverage and accuracy. Each dictionary may include a listing of entities that correspond with a particular entity class (e.g., movie names, music tracks, etc.). As used herein, "entities" are instances of abstract concepts and objects, including people, places, things, events, locations, businesses, movies, and the like. Dictionaries used in SLU systems are typically manually collected or extracted automatically from different language resources. Manual collection is time consuming and costly, but auto-collected dictionaries tend to have a lot noise in that entities are included that do not belong to the entity class. Noisy dictionaries may help little to nothing to improve an SLU model's performance.

Embodiments of the present invention are generally directed to cleaning up noisy dictionaries. Machine learning approaches are used to generate a classifier model for an entity class to weight entities in a candidate dictionary based on the likelihood each entity belongs to the entity class. In accordance with some embodiments, different features are not manually assigned importance. Instead, machine learning approaches are employed to build a classifier model such that the significance of different features is automatically determined.

A classifier model for a given entity class is trained using a seed list that includes positive sample entities that belong to the entity class and a background entity list that includes negative sample entities that do not belong to the entity class. Additionally, the classifier model is trained using clicked URLs (uniform resource locators), search result URLs, and attributes from an entity graph as features of the positive and negative samples. The clicked URLs correspond with URLs identified in a search engine's search click logs as having been clicked for search queries that correspond with sample entities. The search result URLs include URLs returned as search results by performing a search using sample entities as search queries. The entity graph may be an existing knowledge repository that contains information about entities and relationships among entities. Conceptually, entities with similar clicked URL distribution, search result URLs, and entity graph attributes may be predicted to be part of the same entity class.

Once a classifier model has been built for an entity class, it may be used to weight entities in a candidate dictionary. A weighting is provided for each entity to represent the likelihood each entity belongs to the entity class. In some embodiments, an improved dictionary may be provided that includes only those entities that satisfy a weighting threshold, and the improved dictionary may be used by an SLU system. In some embodiments, a weighted dictionary that includes entities and corresponding weightings may be employed by an SLU system. In further embodiments, entities may be clustered based on their weightings and a set of clustered dictionaries may be generated with each clustered dictionary including a cluster of entities. The set of clustered dictionaries may then be employed by an SLU system.

Accordingly, in one aspect, an embodiment of the present invention is directed to one or more computer storage media storing computer-useable instructions that, when used by one or more computing devices, cause the one or more computing devices to perform operations. The operations include accessing a seed list containing positive sample entities that belong to an entity class and accessing a background entity list containing negative sample entities that do not belong to the entity class. The operations also include identifying clicked URLs from search click logs for at least a portion of the positive sample entities and negative sample entities. The operations further include identifying search result URLs for at least a portion of the positive sample entities and negative sample entities. The operations also include identifying attributes from an entity graph for at least a portion of the positive sample entities and negative sample entities. The operations still further include training a classifier model using the clicked URLs, search result URLs, and attributes from the entity graph as features of the positive sample entities and negative sample entities.

In another embodiment, an aspect of the invention is directed to a computer-implemented method. The method includes accessing positive sample entities that belong to an entity class and negative sample entities that do not belong to the entity class. The method also includes identifying clicked URLs from search click logs for at least a portion of the positive sample entities and negative sample entities. The method further includes identifying search result URLs for at least a portion of the positive sample entities and negative sample entities. The method also includes identifying attributes from an entity graph for at least a portion of the positive sample entities and negative sample entities. The method further includes training, using a computing device, a classifier model using the clicked URLs, search result URLs, and attributes from the entity graph as features of the positive sample entities and negative sample entities. The method still further includes employing the classifier model to weight entities in a candidate dictionary to provide weightings for the entities from the candidate dictionary.

A further embodiment of the present invention is directed to a computerized system comprising: one or more processors; and a plurality of components that include computer-useable instructions that may be employed by the one or more processors. The components includes a model building component that trains a classifier model for an entity class using positive sample entities that belong to the entity class and negative sample entities that do not belong to the entity class, the model building component also using clicked URLs, search result URLs, and attributes from an entity graph as features of the positive sample entities and negative sample entities to train the classifier model. The components also include a weighting component that employs the classifier model to weight entities in a candidate dictionary to provide weightings for the entities from the candidate dictionary.

Figure 1:
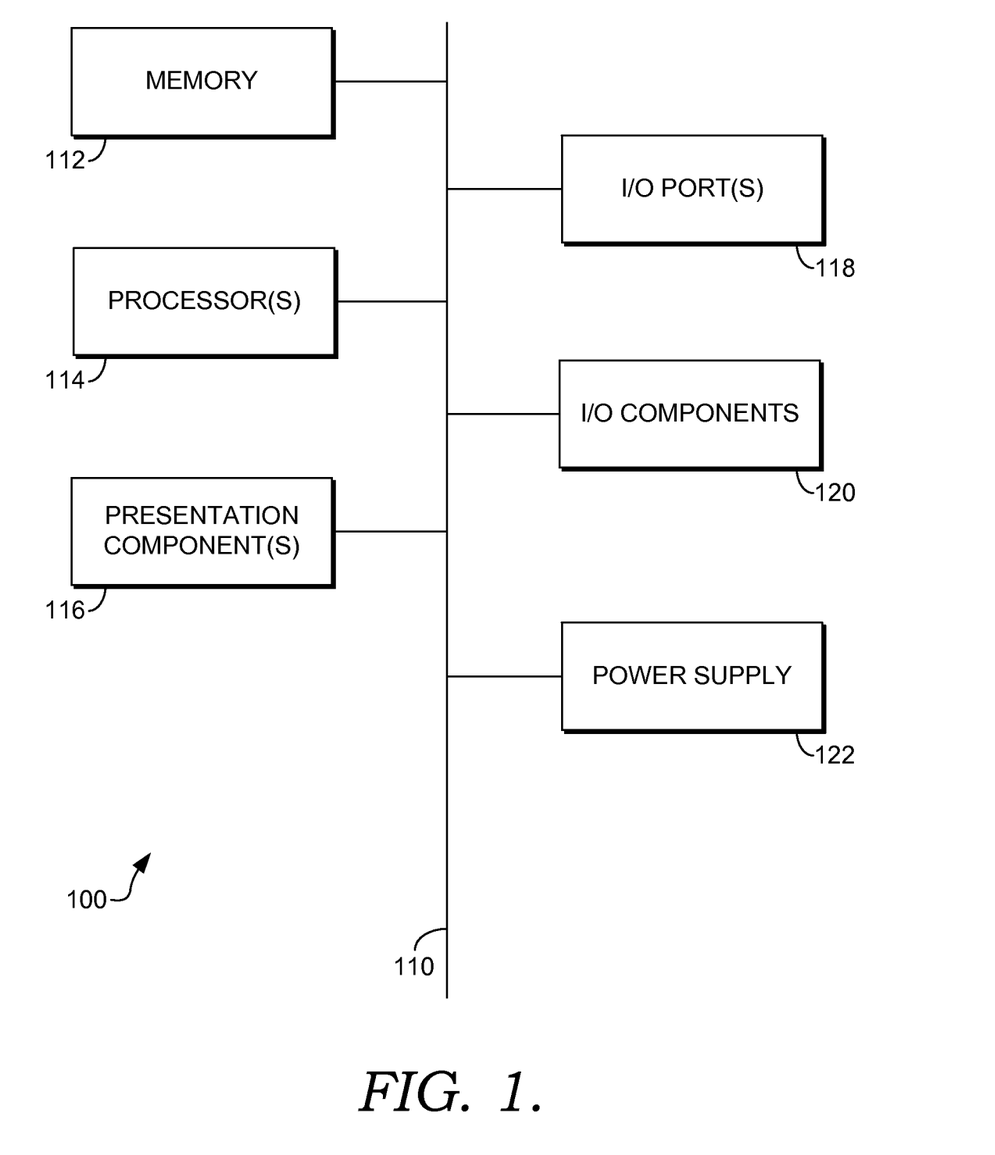
FIG. 1 is a block diagram of an exemplary computing environment suitable for use in implementing embodiments of the present invention.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc. The I/O components 120 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 100. The computing device 100 may be equipped with depth cameras, such as, stereoscopic camera systems, infrared camera systems, RGB camera systems, and combinations of these for gesture detection and recognition. Additionally, the computing device 100 may be equipped with accelerometers or gyroscopes that enable detection of motion. The output of the accelerometers or gyroscopes may be provided to the display of the computing device 100 to render immersive augmented reality or virtual reality.

Figure 2:
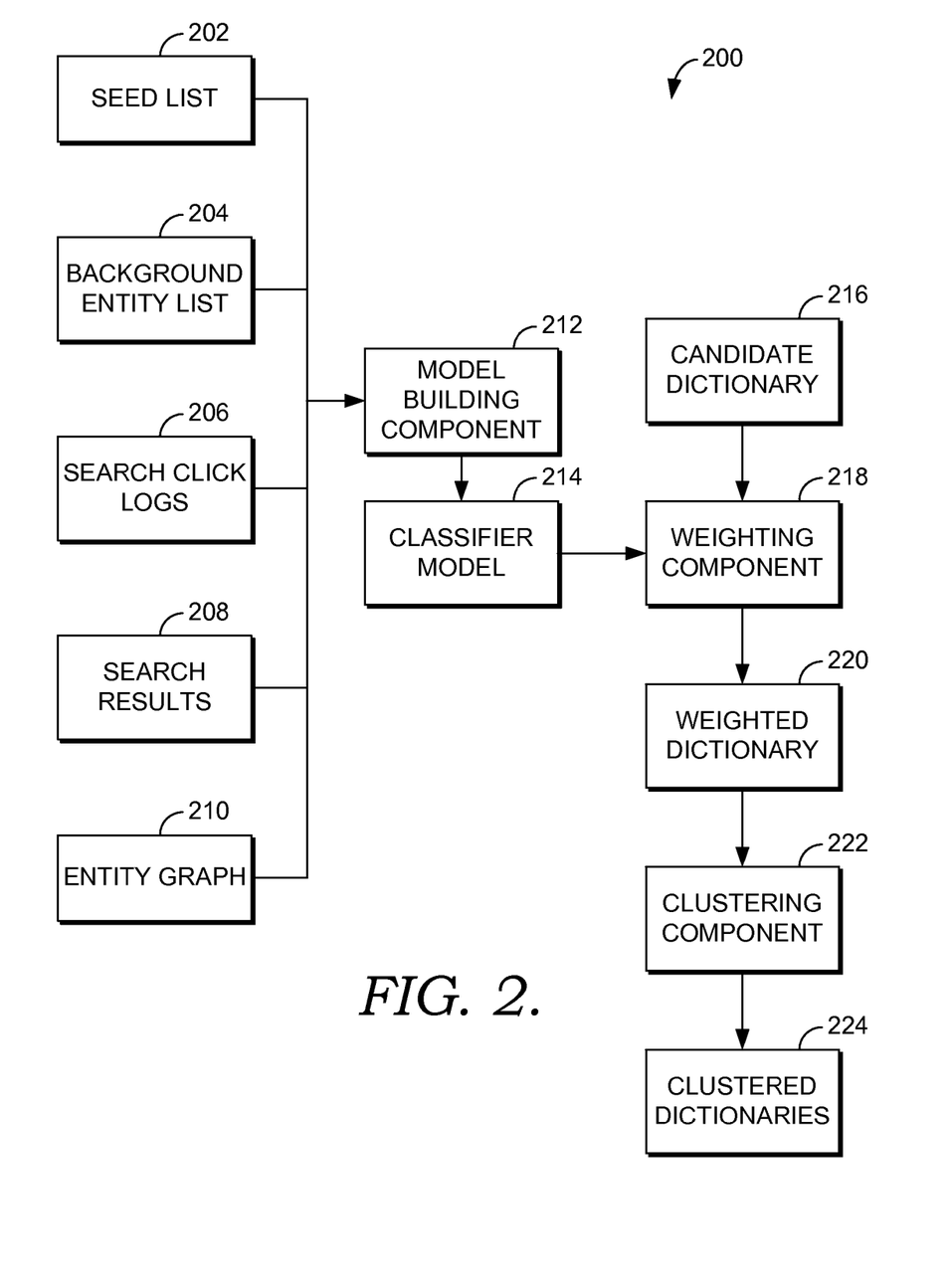
FIG. 2 is a block diagram that illustrates a workflow for generating cleaned dictionaries for use in SLU models in accordance with an embodiment of the present invention.

Referring now to FIG. 2, a block diagram is provided that illustrates a workflow for generating cleaned dictionaries for use in SLU models in accordance with an embodiment of the present invention. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

In accordance with embodiments of the present invention, a number of resources 202, 204, 206, 208, and 210 are used by a model building component 212 that employs machine-learning techniques to build a classifier model 214 for a particular entity class.

The seed list 202 is collection of entities that belong to the particular entity class for which a classifier model is being built. As such, the entities in the seed list 202 are used as positive samples for the entity class. The entities included in the seed list 202 may be identified in a number of different manners within the scope of embodiments of the present invention. By way of example only and not limitation, in some embodiments, the entities may be manually selected and added to the seed list 202. In some embodiments, the entities may be extracted from an existing entity graph (which may or may not be the same as the entity graph 210, discussed in further detail below) by identifying entities indicated as belonging to the entity class by the entity graph. In some embodiments, SLU training data may be employed to identify entities for the seed list 202. In particular, SLU systems typically use a variety of data as features to train the SLU models. The data may include information identifying specific entities and the entity classes to which the entities belong. As such, the SLU training data provides highly reliable entity information.

The background entity list 204 is a collection of entities that do not belong to the entity class. As such, the entities in the background entity list 204 are used as negative samples for the entity class. The entities included in the background entity list 204 may be identified in a number of different manners within the scope of embodiments of the present invention. By way of example only and not limitation, in some embodiments, the entities may be manually selected and added to the background entity list 204. In some embodiments, the entities may be extracted from an existing entity graph (which may or may not be the same as the entity graph 210, discussed in further detail below) by identifying entities indicated as belonging to a different entity class by the entity graph. In some embodiments, SLU training data may be employed to identify entities for the background list 204. Entities in the seed list 202 may be excluded from the background entity list 204.

While the seed list 202 and background entity list 204 provide positive and negative sample entities, respectively, the search click logs 206, search results 208, and the entity graph 210 provide features for the positive and negative sample entities. Referring initially to the search click logs 206, the data in the search click logs 206 used by the system 200 may be accessed from a search engine's search click logs. In particular, larger search engines generally serve hundreds of millions of queries per day. Together with the search queries, clicked URLs are typically logged anonymously in the search engine's search click logs. Clicked URLs may be used as features of the sample entities in the seed list 202 and background entity list 204 by identifying search queries that correspond with the sample entities and extracting clicked URLs for those search queries in the search click logs 206.

As such, the clicked URLs may be used as features to determine the likelihood of an entity being a member of a particular entity class. The assumption behind this is that, for entities belonging to the same entity class: (1) URLs returned from the search engine converge to a small set; and (2) the URLs clicked the most are more query related. As a limited example, Table 1 below shows the top 5 clicked URLs (shortened by domain only) for two different movies: "A Lot Like Love" and "Romeo & Juliet." As can be seen from Table 1, three URLs are common in the top five clicked URLs for these two movies. These URLs are mostly movie domain specific. Therefore, these URLs may be indicative of entities in an entity class for movie names.

TABLE 1

Top Clicked URLs of Two Movies

| A Lot Like Love | Romeo & Juliet |
|---|---|
| imdb.com | en.wikipedia.org |
| en.wikipedia.org | shakespeare.mit.edu |
| movies.msn.com | imdb.com |
| movies.yahoo.com | sparknotes.com |
| rottentomatoes.com | rottentomatoes.com |

One issue with using clicked URLs is that some sample entities may not be covered in the search click logs 206. In such instances, there is no evidence that can be used for those sample entities from the search click logs 206. Some reasons why an entity may not appear in the search click logs 206 includes: (1) some entities are old and have not been searched recently (e.g., a movie was released 18 years ago); (2) some entities are new and have not yet shown up in the search click logs 206 (e.g., a movie was recently released); and (3) the search click logs 206 used by the system 200 may not include all entries from a search engine's click logs as it may be too computationally demanding to do so.

One approach to address the issue of missing logs for sample entities is to use search results from a search engine by using the sample entities as search queries. In some embodiments, search results may be obtained only for those sample entities for which no or only limited information is available in the search click logs 206. In other embodiments, search results may be obtained for all sample entities from the seed list 202 and the background entity list 204. For each sample entity searched, the top N (e.g., 3, 5, 10, etc.) URLs returned in the search results may be used. Accordingly, the search results 208 shown in FIG. 2 comprise URLs returned in response to running searches using sample entities.

In some embodiments, URLs from both the search click logs 206 and the search results 208 are treated similarly in the entity weighting process of the model building component 212. For instance, both may be treated as "clicked URLs." The goal of using the clicked URLs is to generate a score of each entity in a list that reflects the likelihood that the entity is a good member of the entity class. The resulting score is expected to be higher for entities that have less ambiguous membership in the entity class, and lower for entities that are ambiguous or do not belong in the entity class. The following equation may be employed to determine the likelihood a URL is included for entities in a given entity class:

$$P(url \mid entityList) = \frac{Count(url \mid entityList)}{\sum_i Count(url \mid entityList)}$$

The count function is defined as total clicks from all sample entities from all entities in the list (with URLs in the search results 208 counting as clicks):

$$Count(url \mid entityList) = \sum_{e \in entityList} Count(url \mid e)$$

where Count(url|e) is the number of times the URL is clicked (or returned in search results) when the search query is entity e.

To weight an entity, the URL distribution in the seed list 202 and background entity list 204 is compared. For each entity, a weighting score is computed based on URLs (i.e., includes URLs from the search click logs 206 and search results 208) distribution over the seed list 202 and background entity list 204.

$$S(e) = \sum_i (P(url_i \mid e) * \log(P(url_i \mid seedList))) -$$
$$\sum_i (P(url_i \mid e) * \log(P(url_i \mid background\ entityList))) =$$
$$\sum_i P(url_i \mid e) * \log\left(\frac{P(url_i \mid seedList)}{P(url_i \mid backgroundentityList)}\right)$$

Essentially, S(e) measures the difference of two cross entropies: the first cross entropy is for the URL distribution in the seed list 202, and the second cross entropy is for the URL distribution in the background entity list 204.

The entity graph 210 represents a generic semantic space using entities (persons, places, organizations, etc.) and relations between entities. The entity graph 210 may be created for use by the system 200 or may be an existing entity graph. For instance, the entity graph 210 may have been derived based on an existing entity graph used by a search engine. Examples of existing entity graphs include the SANTORI and FREEBASE knowledge repositories. The entity graph 210 may contain a large number of entities, attributes of the entities, and relations among entities. The attributes, such as entity type, name, and description, to name a few, may be used as features of the sample entities for use by the model building component 212. Although only a single entity graph 210 is shown in FIG. 2, it should be understood that multiple entity graphs may be employed.

One particular attribute from the entity graph 210 that may be employed is the entity types. Each entity can potentially match multiple entries in the entity graph 210 if they share the same name. For instance, "Romeo & Juliet" could be a movie name and a music album. All types may be considered to have equal possibility and the feature value of a type may be normalized as follows:

$$S(e_i t) = \sum_{e_i: name(e_i) = name(e), t \in types(e_i)} \frac{kgs(e_i \mid e)}{|types(e_i)|}$$

where t is the type of entity e, name(e) denotes the name of the entity e, and types(e) returns all possible entity types of e. The score $kgs(e_i|e)$ may be assigned independently by an entity graph search tool to measure the probability of $e_i$ when the search query is e based on similarity measurement. For example, the match of movie name to "Romeo & Juliet" may have a score that is greater than the score of the match of music album to "Romeo & Juliet."

The model building component 212 employs machine learning techniques to build a classifier model 214 using the positive sample entities from the seed list 202, the negative sample entities from the background entity list 204, and features extracted from the search click logs 206, search results 208, and entity graph 210. As noted above, the features include clicked URLs for entities in the search click logs 206, URLs returned in the search results 208 for entities, and attributes identified for entities in the entity graph 210. Any of a variety of known machine learning approaches may be employed to build the classifier model 214, such as logistic regression and support vector machine, for instance. In some embodiments, the classifier model 214 is trained by converting each sample entity into a feature vector. The system 200 may be employed to build multiple classifier models with each classifier model being built for each of a variety of different entity classes.

A weighting component 218 may employ the classifier model 214 to weight entities included in a candidate dictionary 216. The output may be a weighted dictionary 220 that includes a weighting for each entity from the candidate dictionary 216. Generally, the weighting determined for each entity may be a score that reflects the likelihood the entity belongs in the entity class. In some embodiments, a higher weighting may reflect that an entity likely belongs to the entity class and a lower weighting may reflect that an entity likely does not belong to the entity class. As an example to illustrate, if the classifier model 214 has been trained for a "movie name" entity class, each weighting determined using the classifier model reflects the likelihood the corresponding entity is a movie name.

In some embodiments, the weighted dictionary 220 may be employed by an SLU system. In other embodiments, a clustering component 222 may process the weighted dictionary 220 to cluster entities based on weightings. Any of a number of known clustering techniques may be employed, such as for instance, K-means clustering or hierarchical agglomerative clustering. This process may provide a number of clustered dictionaries 224. An SLU system may then employ the clustered dictionaries 224 as opposed to the weighted dictionary 220.

In still further embodiments, the weightings may simply be used to remove entities from the candidate dictionary to provide an improved dictionary (not shown) for use by an SLU system. For instance, any entities below a certain weighting threshold (which may be configurable) may be removed from the candidate dictionary to provide the improved dictionary.

The weightings assigned to dictionary terms and/or any new dictionaries generated based on weightings (e.g., a filtered dictionary or clustered dictionaries) may be used in language understanding systems, for instance, to build intent detection and slot models used by the systems. In some embodiments, features from generated dictionaries may be used to train language understanding models. For example, various n-gram features from the dictionaries and absence/existence features may be used alongside n-gram features extracted from surface forms (actual sentences) to train a sequence tagger (which may be a machine learned model such as a Conditional Random Field (CRF) or Neural Network that assigns a tag to each word). By way of illustration, some examples of features that may be used to train models in the "places" domain may include whether a natural language input has any entity in the following dictionaries: country names, city names, business names, states names, and place type. In further embodiments, weightings determined for terms may be directly used in training the language understanding models. Any and all combinations and variations thereof are contemplated to be within the scope of embodiments of the present invention.

Figure 3:
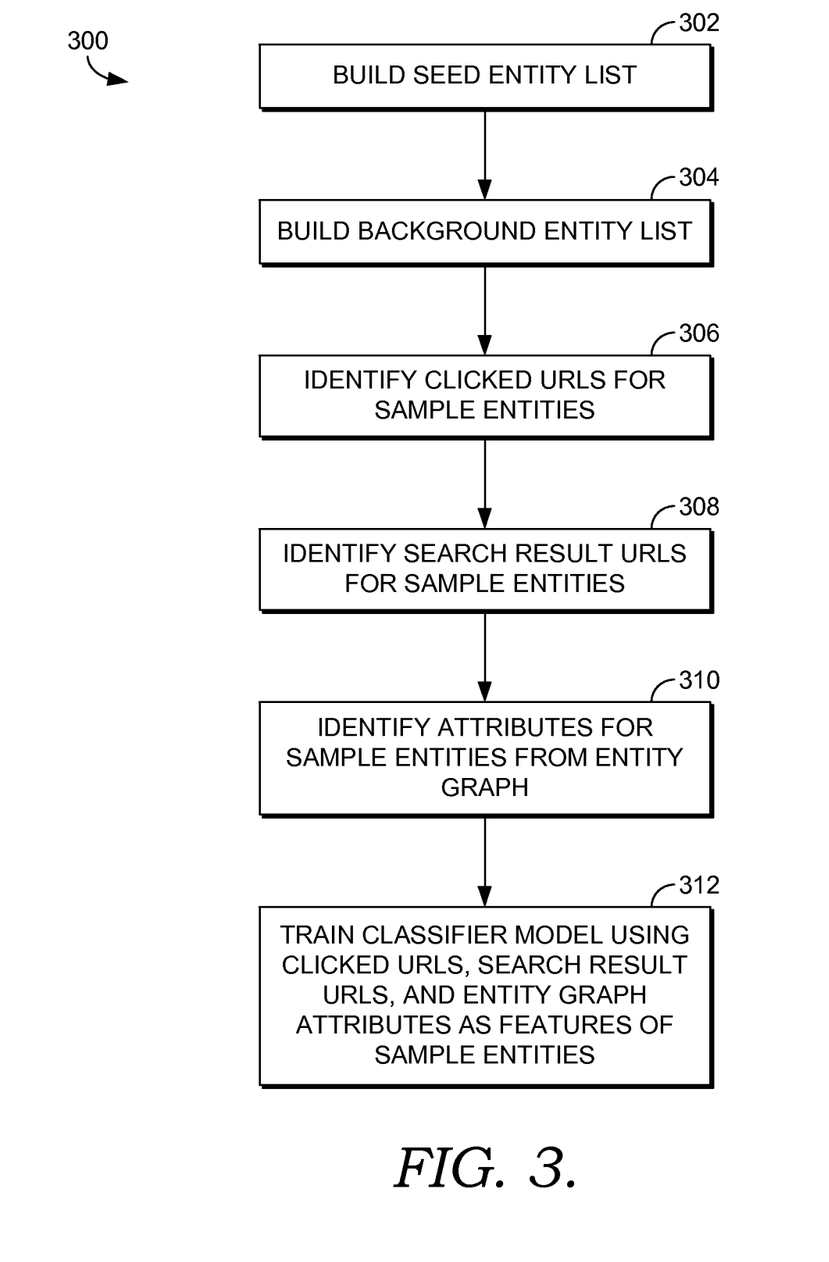
FIG. 3 is a flow diagram showing a method for generating a classifier model for an entity class in accordance with an embodiment of the present invention.

Turning to FIG. 3, a flow diagram is provided that illustrates a method 300 for generating a classifier model for an entity class in accordance with an embodiment of the present invention. As shown at block 302, a seed list is generated. The seed list includes sample entities that belong in the entity class. As noted above, the seed list may be generated manually or algorithmically and may be based on entities identified in an existing entity graph, SLU training data, and/or other source. A background entity list is also generated, as shown at block 304. The background entity list includes sample entities that do not belong in the entity class. Similar to the seed list, the background entity list may be generated manually or algorithmically and may be based on entities identified in an existing entity graph, SLU training data, and/or other source.

Clicked URLs are identified for at least a portion of the sample entities from the seed list and background entity list, as shown at block 306. Generally, search click logs from a search engine may be analyzed to identify search queries that correspond with the sample entities and URLs clicked for those search queries. A search query may be identified as matching a sample entity by analyzing the text of the search query. When a search query in the click search logs is determined to correspond with a given sample entity, the URLs clicked for that search query based on the click search logs are identified as clicked URLs for that sample entity.

Search result URLs are also identified for at least a portion of the sample entities, as shown at block 308. The search result URLs for a given sample entity may be identified by running a search using the sample entity as the search query. The top N search result URLs may then be identified for that sample entity. In some embodiments, search result URLs may be treated similarly to clicked URLs.

Entity attributes from an entity graph are also identified for at least a portion of the sample entities, as shown at block 310. Generally, entities in an entity graph that correspond with sample entities may be identified. An entity name in the entity graph may be analyzed to identify an entity from the entity graph as corresponding with a sample entity. When an entity in the entity graph is identified as corresponding with a sample entity, attributes of the entity from the entity graph may be extracted and correlated with the sample entity. The attributes may include, for instance, entity type, name, and description.

As shown at block 312, a classifier model is trained using the sample entities from the seed list and the background entity list, clicked URLs, search result URLs, and entity graph attributes. Generally, the clicked URLs, search result URLs, and entity graph URLs are used as features of the sample entities from the seed list and background entity list. Entities from the seed list serve as positive samples, while entities from the background entity list serve as negative samples. Any of a variety of known machine learning techniques, such as logistic regression or support vector machine, may be employed to train the classifier model. The classifier model is trained for a particular entity class. Accordingly, the method 300 may be performed for different entity classes to generate a classifier model for each of those entity classes.

Figure 4:
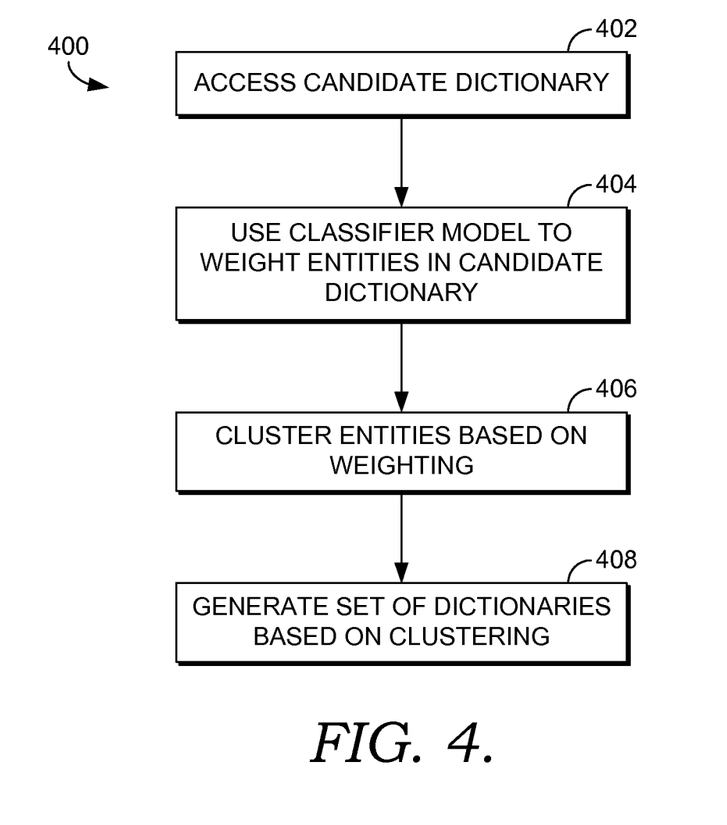
FIG. 4 is a flow diagram showing a method for using a classifier model to weight entities in a dictionary in accordance with an embodiment of the present invention.

Referring next to FIG. 4, a flow diagram is provided that illustrates a method 400 for using a classifier model to weight entities in a dictionary in accordance with an embodiment of the present invention. As shown at block 402, a candidate dictionary 402 is accessed. The candidate dictionary may correspond with a particular entity class and may be a "noisy" dictionary in the sense that includes a number of entities that do not belong in that particular entity class.

A classifier model for the entity class, such as one trained using the method 300 of FIG. 3, is used to weight entities in the candidate dictionary, as shown at block 404. Generally, the weighting determined for each entity may be a score that reflects the likelihood that the entity belongs to the entity class. As noted above, in some embodiments, the weightings may be used to provide an improved dictionary that includes entities that satisfy a weighting threshold. In other embodiments, the weightings may be used to generate a weighted dictionary that contains the entities and an indication of weighting for each entity.

The embodiment shown in FIG. 4 includes clustering entities based on their weightings, as shown at block 406. Any known clustering technique may be employed, such as for instance, K-Means clustering or hierarchical agglomerate clustering. A set of dictionaries are generated based on the clustering, as shown at block 408.

As can be understood, embodiments of the present invention provide for cleaning up noisy dictionaries by providing weightings for entities in the dictionary that reflect the likelihood each entity belongs to a particular entity class. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-executable instructions that, when executed by one or more computing devices, cause the one or more computing devices to perform operations comprising:
    accessing a seed list containing positive sample entities that belong to an entity class;
    accessing a background entity list containing negative sample entities that do not belong to the entity class;
    identifying clicked URLs from search click logs for at least a portion of the positive sample entities and negative sample entities;
    identifying search result URLs for at least a portion of the positive sample entities and negative sample entities;
    identifying attributes from an entity graph for at least a portion of the positive sample entities and negative sample entities;
    training a classifier model using the clicked URLs, search result URLs, and attributes from the entity graph as features of the positive sample entities and negative sample entities; and
    using the classifier model to weight entities in a candidate dictionary to provide weightings for the entities from the candidate dictionary.

2. The one or more computer storage media of claim 1, wherein the seed list is generated based on information from at least one selected from the following: an existing entity graph and training data from a spoken language understanding system.

3. The one or more computer storage media of claim 1, wherein the background entity list is generated based on information from at least one selected from the following: an existing entity graph and training data from a spoken language understanding system.

4. The one or more computer storage media of claim 1, wherein URL search results are obtained for positive sample entities and negative sample entities for which no clicked URLs are available from the search click logs.

5. The one or more computer storage media of claim 1, wherein the classifier model is trained using at least one selected from the following: logistic regression and support vector machines.

6. The one or more computer storage media of claim 1, wherein the operations further comprise:
    using the weightings to generate an improved dictionary that does not include a subset of entities that do not satisfy a weighting threshold; and
    using the improved dictionary in a spoken language understanding system to process a user input.

7. The one or more computer storage media of claim 1, wherein the operations further comprise:
    creating a weighted dictionary using the weightings; and
    employing the weighted dictionary in a spoken language understanding system to process a user input.

8. The one or more computer storage media of claim 1, wherein the operations further comprise:
    clustering entities based on the weightings; and
    generating a set of clustered dictionaries, each clustered dictionary including a cluster of entities.

9. The one or more computer storage media of claim 8, wherein the operations further comprise:
    employing the set of clustered dictionaries in a spoken language understanding system to process a user input.

10. A computer-implemented method comprising:
    accessing positive sample entities that belong to an entity class and negative sample entities that do not belong to the entity class;
    identifying clicked URLs from search click logs for at least a portion of the positive sample entities and negative sample entities;
    identifying search result URLs for at least a portion of the positive sample entities and negative sample entities;
    identifying attributes from an entity graph for at least a portion of the positive sample entities and negative sample entities;
    training, using a computing device, a classifier model using the clicked URLs, search result URLs, and attributes from the entity graph as features of the positive sample entities and negative sample entities; and
    employing the classifier model to weight entities in a candidate dictionary to provide weightings for the entities from the candidate dictionary.

11. The method of claim 10, wherein the positive sample entities and the negative sample entities are identified based on information from at least one selected from the following: an existing entity graph and training data from a spoken language understanding system.

12. The method of claim 10, wherein URL search results are obtained for positive sample entities and negative sample entities for which no clicked URLs are available from the search click logs.

13. The method of claim 10, wherein the method further comprises:
    employing the weightings to generate at least one improved dictionary for use in a spoken language understanding system to process a user input.

14. The method of claim 10, wherein the method further comprises:
 clustering entities based on weighting; and
 generating a set of clustered dictionaries, each clustered dictionary including a cluster of entities.

15. The method of claim 14, wherein the method further comprises:
 employing the set of clustered dictionaries in a spoken language understanding system to process a user input.

16. A computerized system comprising:
 one or more processors; and
 a plurality of components that include computer-executable instructions that are executed by the one or more processors, the components including:
  a model building component that trains a classifier model for an entity class using positive sample entities that belong to the entity class and negative sample entities that do not belong to the entity class, the model building component also using clicked URLs, search result URLs, and attributes from an entity graph as features of the positive sample entities and negative sample entities to train the classifier model; and
  a weighting component that employs the classifier model to weight entities in a candidate dictionary to provide weightings for the entities from the candidate dictionary.

17. The system of claim 16, wherein the positive sample entities are from a seed list and the negative sample entities are from a background entity list, and wherein the seed list and background entity list are generated based on information from at least one selected from the following: an existing entity graph and training data from a spoken language understanding system.

18. The system of claim 16, wherein the weightings for the entities from the candidate dictionary are used to provide at least one improved dictionary.

19. The computerized system of claim 16, wherein the components further comprise:
 a clustering component that clusters entities based on the weightings and generates a set of clustered dictionaries, each clustered dictionary including a cluster of entities.

* * * * *